United States Patent
Wan et al.

(10) Patent No.: US 12,327,306 B2
(45) Date of Patent: Jun. 10, 2025

(54) METHODS, APPARATUSES, ELECTRONIC DEVICE, MEDIUM AND PROGRAM PRODUCT FOR PRESENTING AN ANIMATION

(71) Applicant: Beijing Zitiao Network Technology Co., Ltd., Beijing (CN)

(72) Inventors: Shiqi Wan, Beijing (CN); Tao Kang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/778,794

(22) Filed: Jul. 19, 2024

(65) Prior Publication Data
US 2024/0371065 A1 Nov. 7, 2024

Related U.S. Application Data

(63) Continuation of application No. PCT/CN2023/072338, filed on Jan. 16, 2023.

(30) Foreign Application Priority Data

Jan. 19, 2022 (CN) .......................... 202210062063.4

(51) Int. Cl.
G06T 13/40 (2011.01)
G06T 19/20 (2011.01)

(52) U.S. Cl.
CPC .............. *G06T 13/40* (2013.01); *G06T 19/20* (2013.01); *G06T 2219/2004* (2013.01); *G06T 2219/2016* (2013.01)

(58) Field of Classification Search
CPC . G06T 13/40; G06T 19/20; G06T 2219/2004; G06T 2219/2016
(Continued)

(56) References Cited

U.S. PATENT DOCUMENTS

2011/0161856 A1* 6/2011 Nurmi ............... H04M 1/72457
709/206
2014/0215360 A1 7/2014 Degani
(Continued)

FOREIGN PATENT DOCUMENTS

CN 108933723 A 12/2018
CN 111491174 A 8/2020
(Continued)

OTHER PUBLICATIONS

International Search Report for PCT/CN2023/072338, mailed Apr. 20, 2023, 5 pages.
(Continued)

*Primary Examiner* — Hai Tao Sun
(74) *Attorney, Agent, or Firm* — Astute IP Law Group

(57) ABSTRACT

Provided in the present disclosure are methods and apparatuses, an electronic device, a medium, and a program product for presenting an animation. A method for presenting an animation comprises: receiving a sending operation for a target session message, wherein the target session message comprises a first target interactive picture; in response to the sending operation, sending the target session message to a second user; and if the first target interactive picture comprises a first object, presenting a sending animation of the first object, the sending animation comprising a sending track of the first object, the sending track being different from a receiving track, the receiving track being a movement track of the first object included in a receiving animation of the first object, and the receiving animation being an animation presented, in response to receiving the first target interactive picture, by a second user.

18 Claims, 4 Drawing Sheets

(58) Field of Classification Search
USPC .......................................................... 345/473
See application file for complete search history.

(56) References Cited

U.S. PATENT DOCUMENTS

| | | | |
|---|---|---|---|
| 2016/0021047 A1* | 1/2016 | Sawato | H04W 4/029 |
| | | | 455/456.3 |
| 2018/0061110 A1 | 3/2018 | Flores | |
| 2020/0137004 A1* | 4/2020 | Yu | G06Q 10/107 |
| 2021/0067476 A1 | 3/2021 | Baker et al. | |

FOREIGN PATENT DOCUMENTS

| | | |
|---|---|---|
| CN | 111787411 A | 10/2020 |
| CN | 112764612 A | 5/2021 |
| CN | 113556278 A | 10/2021 |
| CN | 113713382 A | 11/2021 |
| CN | 114419201 A | 4/2022 |
| WO | 2020221228 A1 | 11/2020 |

OTHER PUBLICATIONS

Search Report for Chinese Patent Application No. 202210062063.4, mailed Oct. 26, 2023, 1 page.
Extended European Search Report for European Patent Application No. 23742844.6, mailed on Apr. 3, 2025, 10 pages.

* cited by examiner

METHODS, APPARATUSES, ELECTRONIC DEVICE, MEDIUM AND PROGRAM PRODUCT FOR PRESENTING AN ANIMATION

CROSS-REFERENCE TO RELATED APPLICATION(S)

This application is a Continuation Application of International Patent Application No. PCT/CN2023/072338, filed Jan. 16, 2023, which claims priority to Chinese Patent Application No. 202210062063.4 filed with the China Patent Office on Jan. 19, 2022, the disclosures of which are incorporated herein by reference in their entities.

FIELD

The present disclosure relates to a field of computer technology, for example, to methods, apparatuses, an electronic device, a medium and a program product for presenting an animation.

BACKGROUND

A user may send an instant messaging message containing interactive pictures. However, the way of presenting the interactive pictures is relatively simple, and cannot meet the diverse needs of users.

SUMMARY

The present disclosure provides methods, apparatuses, an electronic device, a medium, and a program product for presenting an animation to enable presentation of an animation of interactive pictures, enriching the presenting ways of the interactive pictures.

An embodiment of the present disclosure provides a method for presenting an animation comprising:
  receiving a sending operation for a target session message, wherein a first target interactive picture is contained in the target session message;
  sending, in response to the sending operation, the target session message to a second user;
  if the first target interactive picture comprises a first object, presenting a sending animation of the first object, wherein the sending animation comprises a sending track of the first object, the sending track being different from a receiving track, the receiving track being a movement track of the first object comprised in a receiving animation of the first object, and the receiving animation being an animation presented by a second user side in response to receiving the first target interactive picture.

An embodiment of the present disclosure provides a method for presenting an animation comprising:
  receiving a target session message sent by a first user, wherein a first target interactive picture is contained in the target session message;
  presenting the target session message in a session interface;
  if the first target interactive picture comprises a first object, presenting a receiving animation of the first object in the session interface, wherein the receiving animation comprises a receiving track of the first object, the receiving track being different from a sending track, the sending track being a movement track of the first object comprised in a sending animation of the first object, and the sending animation being an animation presented by a first user side in response to sending the first target interactive picture.

An embodiment of the present disclosure further provides an apparatus for presenting an animation comprising:
  an operation receiving module configured to receive a sending operation for a target session message, wherein a first target interactive picture is contained in the target session message;
  a message sending module configured to send, in response to the sending operation, the target session message to a second user;
  a sending animation presentation module configured to when the first target interactive picture comprises a first object, present a sending animation of the first object, wherein the sending animation comprises a sending track of the first object, the sending track being different from a receiving track, the receiving track being a movement track of the first object comprised in a receiving animation of the first object, and the receiving animation being an animation presented by a second user side in response to receiving the first target interactive picture.

An embodiment of the present disclosure further provides an apparatus for presenting an animation comprising:
  a message receiving module configured to receive a target session message sent by a first user, wherein a first target interactive picture is contained in the target session message;
  a message presentation module configured to present the target session message in a session interface;
  a receiving animation presentation module configured to when the first target interactive picture comprises a first object, present a receiving animation of the first object in the session interface, wherein the receiving animation comprises a receiving track of the first object, the receiving track being different from a sending track, the sending track being a movement track of the first object comprised in a sending animation of the first object, and the sending animation being an animation presented by a first user side in response to sending the first target interactive picture.

An embodiment of the present disclosure further provides an electronic device comprising:
  one or more processors;
  a memory configured to store one or more programs,
  the one or more programs, when executed by the one or more processors, cause the one or more processors to implement a method for presenting an animation as described in an embodiment of the present disclosure.

An embodiment of the present disclosure further provides a computer-readable storage medium having stored thereon a computer program which, when executed by a processor, implements a method for presenting an animation as described in an embodiment of the present disclosure.

An embodiment of the present disclosure further provides a computer program product which, when executed by a computer, causes the computer to implement a method for presenting an animation as described in an embodiment of the present disclosure.

DETAILED DESCRIPTION OF EMBODIMENTS

Embodiments of the present disclosure will be described below with reference to the accompanying drawings. While certain embodiments of the present disclosure have been illustrated in the accompanying drawings, the disclosure may be embodied in various forms and should not be construed as limited to the embodiments set forth herein; rather, these embodiments are provided so that this disclosure will be understood. The drawings and examples of the present disclosure are for illustrative purposes only and are not intended to limit the scope of the disclosure.

The various steps recited in method implementations of the present disclosure may be performed in a different order and/or in parallel. Moreover, the method implementations may include additional steps and/or omit performing the steps shown. The scope of the present disclosure is not limited in this respect.

As used herein, the terms "comprises", "comprising", and variations thereof are open-ended terms, i.e. "including, but not limited to". The term "based on" is "based, at least in part, on". The term "one embodiment" means "at least one embodiment"; the term "another embodiment" means "at least one further embodiment"; the term "some embodiments" means "at least some embodiments". Relevant definitions of other terms will be given in the following description.

References in the disclosure to "first", "second", and the like are merely used to distinguish one from another device, module or unit, and are not intended to limit the order or interdependence of the functions performed by the devices, modules or units.

Modifications of "a" or "an" or "a plurality of" in this disclosure are intended to be exemplary and not limiting, and are to be construed as "one or more" unless the context indicates otherwise.

The names of messages or information interacted between multiple apparatuses in implementations of the present disclosure are for illustrative purposes only and are not intended to limit the scope of such messages or information.

Figure 1:
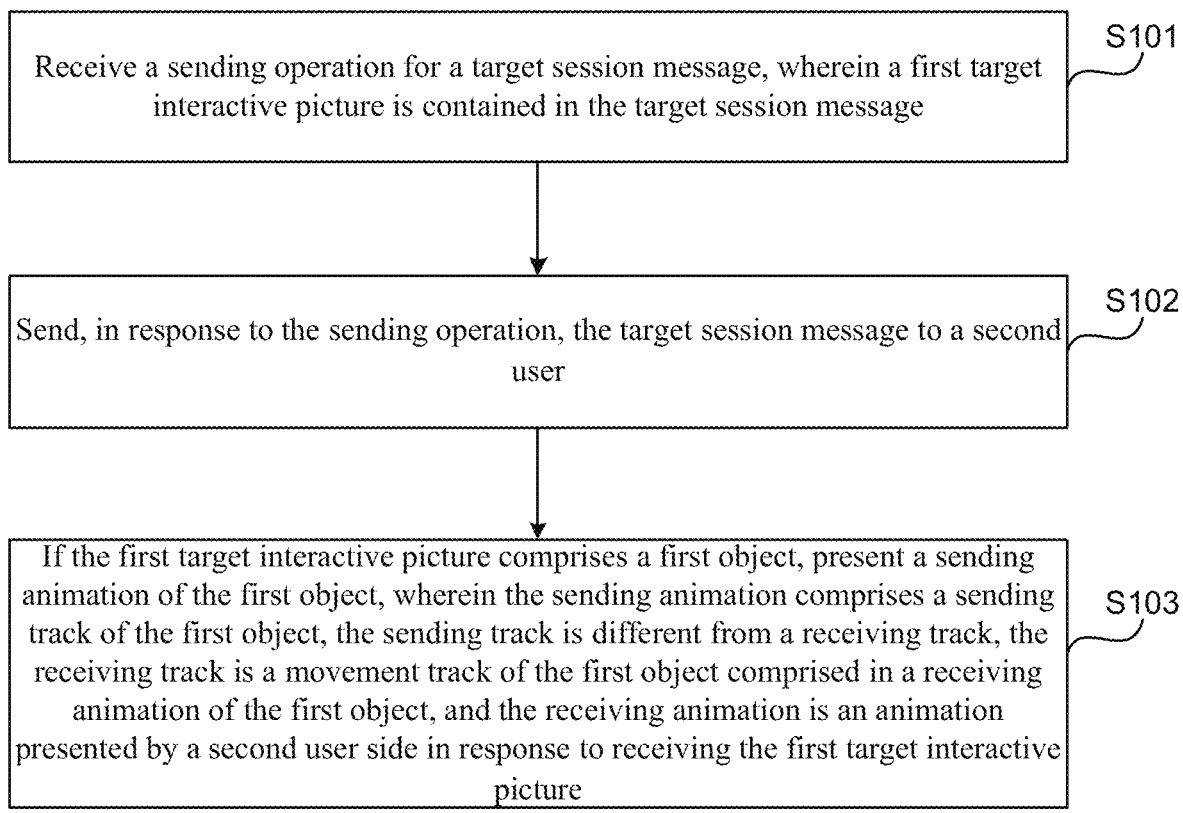
FIG. 1 is a flow diagram of a method for presenting an animation provided by an embodiment of the present disclosure.

FIG. 1 is a flow diagram of a method for presenting an animation provided by an embodiment of the present disclosure. The method may be performed by an apparatus for presenting an animation, wherein the apparatus may be implemented by software and/or hardware, configurable in an electronic device, and configurable in a mobile phone or a tablet computer. The method for presenting an animation provided by the embodiment of the present disclosure is applicable to a scenario in which a sending animation of an interactive picture is presented when the interactive picture is sent. As shown in FIG. 1, the method for presenting an animation provided by the present embodiment may include the following steps.

S101, receiving a sending operation for a target session message, wherein a first target interactive picture is contained in the target session message.

The sending operation may be an operation of sending a session message containing the first target interactive picture, such as an operation of triggering a sending control after editing the target session message is completed, or an operation of triggering the sending of the first target interactive picture. Accordingly, the target session message may be a session message to which the sending operation is directed, which may contain the first target interactive picture, and may or may not contain a text. The first target interactive picture may be an interactive picture containing an object preset with different sending and receiving animations, a preset interactive picture preset with at least two candidate interactive animations, or an interactive picture containing a preset object contained in the preset interactive picture.

The first user can trigger a sending control after editing the session message it wants to send; alternatively, when the first user wants to send an interactive picture, the interactive picture being displayed in an interactive panel may be triggered. Accordingly, upon detecting that the sending control or one interactive picture is triggered by the first user, the electronic device can decide whether the session message contains the first target interactive picture, or decide whether the interactive picture triggered by the first user is the first target interactive picture, and in response to the first target interactive picture is contained in the session message or the interactive picture triggered by the first user is the first target interactive picture, take the session message/the interactive picture as a target session message, and determine that a sending operation for the target session message is received.

S102, in response to the sending operation, sending the target session message to a second user.

The second user may be one or more other users included in a current session except the first user, and may be all other users contained in the current session except the first user. Only the first user and one second user may be included in the current session, or the first user and a plurality of second users may be included in the current session, which is not limiting in the present embodiment.

Upon receiving the sending operation for the target session message, the electronic device may send and present the target session message in the current session on which the sending operation functions, i.e., in the current session, send the target session message to the second user(s) in the current session and present the target session message in the current session.

S103, if the first target interactive picture comprises a first object, presenting a sending animation of the first object, wherein the sending animation comprises a sending track of the first object, the sending track being different from a receiving track, the receiving track being a movement track of the first object comprised in a receiving animation of the first object, and the receiving animation being an animation presented by a second user side in response to receiving the first target interactive picture.

The first object may be an object preset with different sending and receiving animations, such as a snowball, a water drop, etc. The sending animation may be understood as an animation presented upon sending the interactive picture containing the first object, and the receiving animation may be understood as an animation presented upon receiving the interactive picture containing the first object. That is, the sending animation may be presented at the side of the user sending the interactive picture when the interactive picture containing the first object is sent, and the receiving animation may be presented at the side of the user receiving the interactive picture when the interactive picture containing the first object is received. In the sending animation and the receiving animation, the first object may have different movement tracks, i.e., the sending track of the first object in its sending animation and the receiving track of the first object in its receiving animation may be different. Accordingly, the sending track may be a movement track of the first object in its sending animation, and the receiving track may be a movement track of the first object in its receiving animation.

If the first object is contained in the first target interactive picture, the sending animation of the first object can be acquired, and the sending animation of the first object is presented. For example, the sending animation of the first object is presented on an upper layer of a plurality of session messages in a current session presented on a current interface, and when the presentation of the sending animation is completed, the presentation of the sending animation is stopped.

In this embodiment, different sending and receiving animations may be set for the first object in advance. Thus, when an interactive picture containing the first object is sent, a sending animation of the first object can be presented, and when the interactive picture containing the first object is received, a receiving animation of the first object can be presented, thereby enriching the presentation form of the interactive picture at the time of being sent and received, and improving the interaction effect at the time of sending and receiving the interactive picture.

In this embodiment, the sending track and the receiving track of the first object may be different. As an example, the first object may have different moving directions and/or moving routes in its sending and receiving animations. For example, the moving direction of the first object in its sending animation and the moving direction of the first object in its receiving animation may be at an angle, and/or the moving route of the first object in its sending animation and the moving route of the first object in its receiving animation may not completely overlap. Illustratively, the sending track being different from the receiving track comprises a moving direction corresponding to the sending track being opposite to a moving direction corresponding to the receiving track, so as to present a visual effect of the first object moving away from the first user and moving to the second user. For example, the first object may move from left to right/from right to left in its sending animation, and from right to left/from left to right in its receiving animation; alternatively, the first object may move from near to far in its sending animation, and from far to near in its receiving animation, etc. The following description is illustrated with reference to the example that the first object can move from near to far in its sending animation and from far to near in its receiving animation.

In an implementation, a sending visual characteristic of sending the first object in a three-dimensional space is presented in the sending animation, the sending visual characteristic being different from a receiving visual characteristic, and the receiving visual characteristic being a visual characteristic of receiving the first object in the three-dimensional space presented in the receiving animation.

The sending visual characteristic may be a visual characteristic presented by the first object in its sending animation. The receiving visual characteristic may be a visual characteristic presented by the first object in its receiving animation.

In the above-described implementation, in addition to having different movement tracks in the sending and receiving animations of the first object, the first object may have a visual difference of sending and receiving in the three-dimensional space. For example, the first object may present, in its sending animation, a sending visual characteristic of sending the first object in the three-dimensional space, and present, in its receiving animation, a receiving visual characteristic of receiving the first object in the three-dimensional space, so as to present, in the sending animation of the first object, a visual effect of sending the first object in the three-dimensional space, and present, in the receiving animation of the first object, a visual effect of receiving the first object in the three-dimensional space.

Here, the sending visual characteristic and the receiving visual characteristic of the first object can be flexibly set based on a three-dimensional visual effect, and optionally, the sending visual characteristic comprises a gradual decrease in size of the first object; the receiving visual characteristic comprises a gradual increase in size of the first object. That is, in a process of controlling the first object to move along the sending track in its sending animation, the display size of the first object may be gradually reduced; in a process of controlling the first object to move along the receiving track in its receiving animation, the display size of the first object may be gradually increased.

In an implementation, the sending visual characteristic of the first object may include a visual characteristic of throwing the first object towards a distant place, and the receiving visual characteristic of the first object may include a visual characteristic of throwing the first object towards the second user from far to near. For example, in the sending animation, the first object may be controlled to move along a parabola from near to far and gradually fall (or rise first and then fall); and during the movement, the display size of the first object is gradually reduced from an original display size of the first object in accordance with a distance of the first object moving in a horizontal direction. In the receiving animation, the first object may be controlled to move along a parabola from far to near and gradually fall (or rise first and then fall); and during the movement, the display size of the first object is gradually increased to its original display size in accordance with the distance of the first object moving in the horizontal direction.

In an implementation, the first target interactive picture further comprises a second object, the second object having a same movement track in the sending animation and the receiving animation, or a position of the second object remaining unchanged in the sending animation and the receiving animation.

In the above-described implementation, in addition to the first object having different movement tracks in the sending animation and the receiving animation, the second object having the same movement track in the sending and receiving animations or whose position remaining unchanged in the sending and receiving animations, such as an image or a character having the same movement track in the sending and receiving animations or whose position remaining unchanged in the sending and receiving animations, or the like, may be contained in the first target interactive picture. Accordingly, in addition to the first object, the second object may be displayed in the sending/receiving animation, wherein the first object moves along a sending/receiving track in the sending/receiving animation; the second object moves along the same movement track in the sending and receiving animations, or the second object remains its position unchanged in both the sending and receiving animations, e.g., remains the display of the second object or displays the second object with a certain display frequency at a preset display position.

The method for presenting an animation provided in the present embodiment receives a sending operation for a target session message, wherein the target session message contains a first target interactive picture; in response to the sending operation, sends the target session message to the second user; if a first object is contained in the first target interactive picture, presents a sending animation of the first object, wherein the sending animation comprises a sending track of the first object, the sending track being different from a receiving track of the first object comprised in a receiving animation of the first object, and the receiving animation being an animation presented by a second user side in response to receiving the first target interactive picture. With the above-described solution(s), different animations are presented on the first user side at which the target interactive picture is sent and on the second user side at which the target interactive picture is received, which can enrich the presentation form of the interactive picture at the time of being sent and received and improve the interaction effect at the time of sending and receiving the interactive picture.

Figure 2:
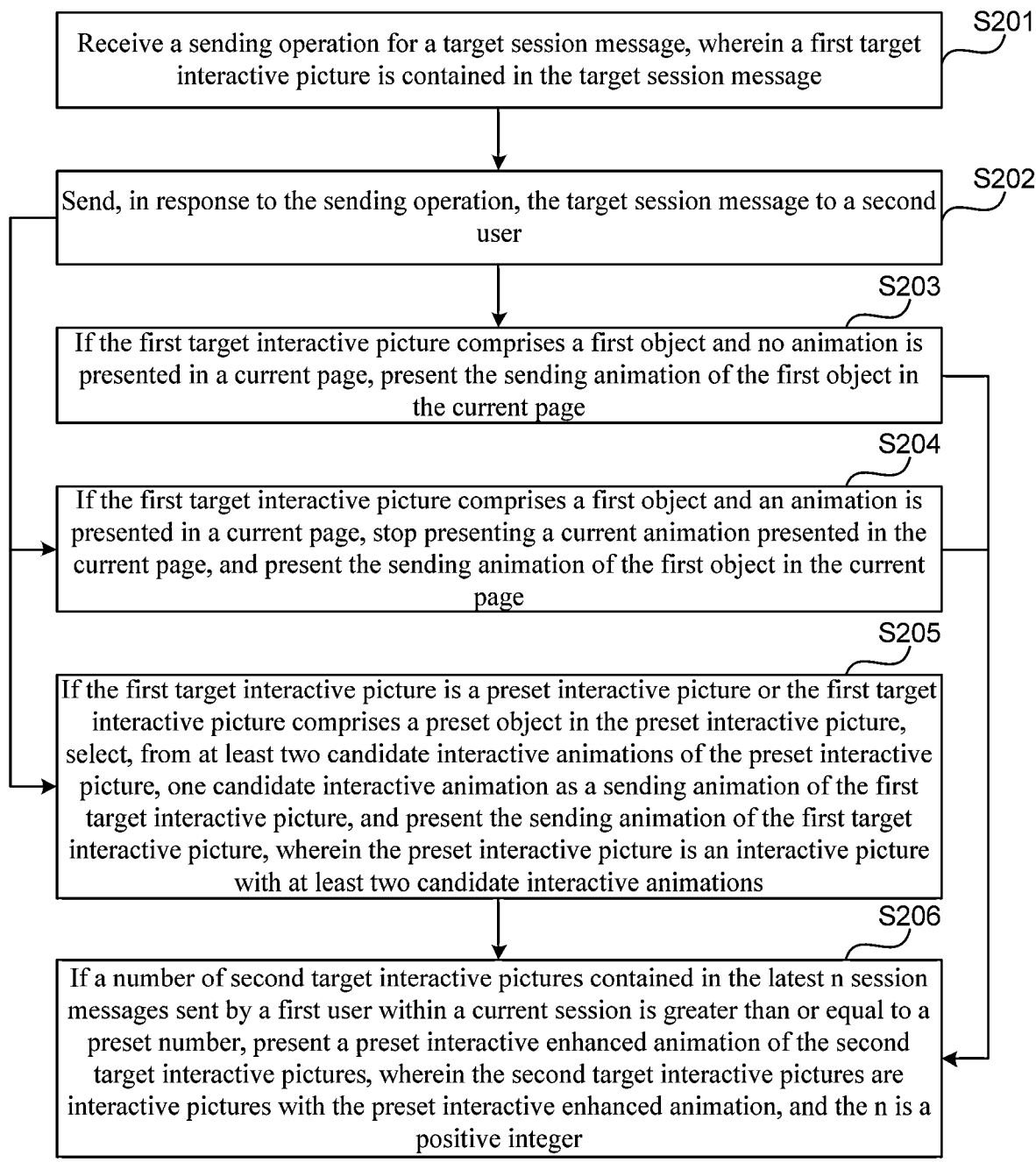
FIG. 2 is a flow diagram of another method for presenting an animation provided by an embodiment of the present disclosure.

FIG. 2 is a flow diagram of another method for presenting an animation provided by an embodiment of the present disclosure. The solution in this embodiment may be combined with one or more alternatives in the embodiments described above. Optionally, presenting a sending animation of the first object comprises: if no animation is presented in a current interface, presenting a sending animation of the first object in the current interface; alternatively, if an animation is presented in a current interface, stopping presenting the current animation presented in the current interface, and presenting the sending animation of the first object in the current interface.

Optionally, the method for presenting an animation provided by the present embodiment further comprises: if the first target interactive picture is a preset interactive picture or the first target interactive picture comprises a preset object in the preset interactive picture, selecting, from at least two candidate interactive animations of the preset interactive picture, one candidate interactive animation as a sending animation of the first target interactive picture, and presenting the sending animation of the first target interactive picture, wherein the preset interactive picture is an interactive picture with at least two candidate interactive animations.

Optionally, the method for presenting an animation provided by the present embodiment further comprises: if second target interactive pictures whose number is greater than or equal to a preset number are contained in the latest n session messages sent by a first user within a current session, presenting a preset interactive enhanced animation of the second target interactive pictures, wherein the second target interactive pictures are interactive pictures with the preset interactive enhanced animation, and the n is a positive integer.

As shown in FIG. 2, the method for presenting an animation provided by the present embodiment may comprise the following steps.

S201, receiving a sending operation for a target session message, wherein a first target interactive picture is contained in the target session message;

S202, in response to the sending operation, sending the target session message to a second user, and performing S203, S204 or S205.

S203, if the first target interactive picture comprises a first object and no animation is presented in a current interface, presenting a sending animation of the first object in the current interface, and performing S206, wherein the sending animation comprises a sending track of the first object, the sending track being different from a receiving track, the receiving track being a movement track of the first object comprised in a receiving animation of the first object, and the receiving animation being an animation presented by a second user side in response to receiving the first target interactive picture.

In the present embodiment, when no animation is presented in the current interface, for example, when a sending animation or a receiving animation of any object is not presented in the current interface and a preset interactive enhanced animation of any interactive picture is not presented, if the first object is included in the first target interactive picture, the sending animation of the first object can be directly presented in the current interface.

S204, if the first target interactive picture comprises a first object and an animation is presented in a current interface, stopping presenting a current animation presented in the current interface, and presenting a sending animation of the first object in the current interface, and performing S206.

In the present embodiment, when an animation is being presented in the current interface, for example, when a sending animation or a receiving animation of an object is being presented in the current interface, or when a preset interactive enhanced animation of an interactive picture is being presented in the current interface, if the first object is included in the first target interactive picture, the presentation of the animation presented in the current interface may be terminated, and the sending animation of the first object is presented in the current interface.

When an animation is being presented in the current interface, for example, when a sending animation or a receiving animation of an object is being presented in the current interface, or a preset interactive enhanced animation of an interactive picture is being presented in the current interface, if the first object is included in the first target interactive picture, the present embodiment may also continue to present the animation presented in the current interface, and cancel the presentation of the sending animation of the first object; alternatively, continue to present the animation presented in the current interface, and present the sending animation of the first object in the current interface after the animation is presented, which is not limiting in the present embodiment.

S205, if the first target interactive picture is a preset interactive picture or the first target interactive picture comprises a preset object in the preset interactive picture, selecting, from at least two candidate interactive animations of the preset interactive picture, one candidate interactive animation as a sending animation of the first target interactive picture, and presenting the sending animation of the first target interactive picture, wherein the preset interactive picture is an interactive picture with at least two candidate interactive animations.

The preset interactive picture may be an interactive picture with at least two candidate interactive animations, and each of the at least two candidate interactive animations may be used for presenting as a sending/receiving animation of the preset interactive picture. The preset interactive picture may comprise a preset object, and the preset object may have different visual characteristics and/or movement tracks in different candidate interactive animations. The preset object may be the same or different object as the first object.

When the first target interactive picture is the preset interactive picture or contains the preset object in the preset interactive picture, at least one candidate interactive animation of the preset interactive picture can be acquired, and one candidate interactive animation can be selected, from the candidate interactive animations, as a sending animation of the first target interactive picture. For example, one candidate interactive animation is randomly selected from the candidate interactive animations as a sending animation of the first target interactive picture. Alternatively, according to a preset sequence, a candidate interactive animation, which is located after the animation presented upon the last sending and/or receiving of the first target interactive picture and is adjacent to the animation, is selected, from the candidate interactive animations, as the sending animation of the first target interactive picture. The sending animation of the first target interactive picture is presented in the current interface. For example, when no animation is presented in the current interface, the sending animation of the first target interactive picture can be directly presented in the current interface; when an animation is presented in the current interface, the presentation of the animation can be terminated and the sending animation of the first target interactive picture is presented in the current interface, or the currently presented animation is continued to be presented in the current interface and the presentation of the sending animation of the first target interactive picture is cancelled, or the currently presented animation is continued to be presented in the current interface and the sending animation of the first target interactive picture is presented in the current interface after the presentation of the animation is completed.

S206, if second target interactive pictures whose number is greater than or equal to a preset number are contained in the latest n session messages sent by a first user within a current session, presenting a preset interactive enhanced animation of the second target interactive pictures, wherein the second target interactive pictures are interactive pictures with the preset interactive enhanced animation, and the n is a positive integer.

The second target interactive pictures may be interactive pictures with the preset interactive enhanced animation, which may be the same or different interactive pictures as the first target interactive picture. The n and the preset number both can be set as required. For example, the n can be set to a numerical value of 3 or 5, etc. and the preset number can be set to a numerical value of 5 or 10, etc.

As an example, after a session message is sent in a current session based on a sending operation of the first user, whether the session message contains the second target interactive pictures can be determined. If the session message contains the second target interactive pictures, the number of the second target interactive pictures contained in the latest n session messages sent by the first user in the current session is counted. If the number is greater than or equal to a preset number, a preset interactive enhanced animation of the second target interactive pictures is presented in the current interface. If the number is less than the preset number, the example returns to perform the operation of determining whether the session message contains the second target interactive pictures after the session message is sent in the current session based on the sending operation of the first user. If the session message does not contain the second target interactive pictures, the example returns to perform the operation of determining whether the session message contains the second target interactive pictures after the session message is sent in the current session based on the sending operation of the first user.

In the present embodiment, the presenting way of the preset interactive enhanced animation of the second target interactive pictures can be flexibly set. For example, when no animation is presented in the current interface, the preset interactive enhanced animation of the second target interactive pictures is directly presented in the current interface; and/or when an animation is presented in the current interface, the presentation of the animation presented in the current interface is terminated and the preset interactive enhanced animation of the second target interactive pictures is presented in the current interface, or the animation is continued to be presented in the current interface and when the presentation of the animation is completed, the preset interactive enhanced animation of the second target interactive pictures is presented in the current interface.

The method for presenting an animation provided in the present embodiment, when different interactive pictures are sent or received, adopts different ways to present the animation of the different interactive pictures, which can enrich the presentation forms of the interactive pictures and improve the user's experience.

Figure 3:
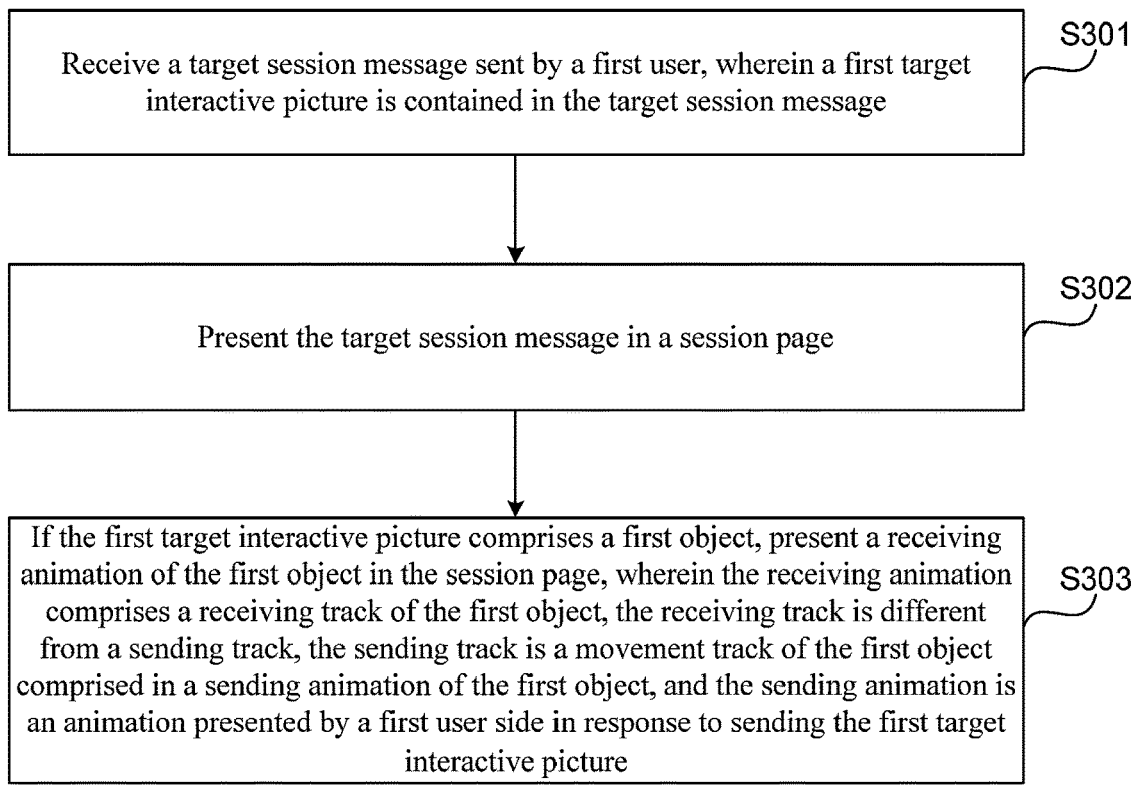
FIG. 3 is a flow diagram of yet another method for presenting an animation provided by an embodiment of the present disclosure.

FIG. 3 is a flow diagram of a method for presenting an animation provided by an embodiment of the present disclosure. The method may be performed by an apparatus for presenting an animation, wherein the apparatus may be implemented by software and/or hardware, configurable in an electronic device, and configurable in a mobile phone or a tablet computer. The method for presenting an animation provided by the embodiment of the present disclosure is applicable to a scenario in which a receiving animation of an interactive picture is presented when the interactive picture is receiving. As shown in FIG. 3, the method for presenting an animation provided by the present embodiment may include the following steps.

S301, receiving a target session message sent by a first user, wherein a first target interactive picture is contained in the target session message.

When the first user sends the target session message to a second user in a current session, the electronic device at the second user side may receive the target session message sent by the first user.

The target session message may be a session message sent by the first user, which may contain a first target interactive picture, and may or may not contain a text. The first target interactive picture may be an interactive picture containing an object preset with different sending and receiving animations, a preset interactive picture preset with at least two candidate interactive animations, or an interactive picture containing a preset object contained in the preset interactive picture. Accordingly, the first user may be a user that sends the target session message in the current session. The current session may include only the first user and one second user, or may include the first user and a plurality of second users, which is not limiting in the present embodiment.

S302, presenting the target session message in a session interface.

when the target session message sent by the first user is received, the target session message may be presented in a session interface of the current session.

S303, if the first target interactive picture comprises a first object, presenting a receiving animation of the first object in the session interface, wherein the receiving animation comprises a receiving track of the first object, the receiving track is different from a sending track, the sending track is a movement track of the first object comprised in a sending animation of the first object, and the sending animation is an animation presented by a first user side in response to sending the first target interactive picture.

The first object may be an object preset with different sending and receiving animations, such as a snowball, a water drop, etc. The receiving animation may be understood as an animation presented upon receiving the interactive picture containing the first object, and the sending animation may be understood as an animation presented upon sending the interactive picture containing the first object. That is, the receiving animation may be presented at the user side receiving the interactive picture when the interactive picture containing the first object is received, and the sending animation may be presented at the user side sending the interactive picture when the interactive picture containing the first object is sent. In the receiving animation and the sending animation, the first object may have different movement tracks, i.e., the receiving track of the first object in its receiving animation and the sending track of the first object in its sending animation may be different. Accordingly, the receiving track may be a movement track of the first object in its receiving animation, and the sending track may be a movement track of the first object in its sending animation.

If the first object is contained in the first target interactive picture, the receiving animation of the first object can be acquired, and the receiving animation of the first object is presented. For example, the receiving animation of the first object is presented on an upper layer of a plurality of session messages in a current session presented on a session interface, and when the presentation of the receiving animation is completed, the presentation of the receiving animation is stopped.

In the present embodiment, the presenting way of the receiving animation of the first object can be flexibly set. For example, when no animation is presented in a session interface at which the current session is located, the receiving animation of the first object can be directly presented in the session interface; when an animation is presented in the session interface, the presentation of the animation can be terminated and the receiving animation of the first object is presented in the session interface, or the currently presented animation is continued to be presented in the session interface and the presentation of the receiving animation of the first object is cancelled, or the currently presented animation is continued to be presented in the session interface and the receiving animation of the first object is presented in the session interface after the presentation of the animation is completed, which is not limiting in this embodiment.

In the present embodiment, different receiving and sending animations may be preset for the first object. Thus, when an interactive picture containing the first object is received, a receiving animation of the first object can be presented, and when the interactive picture containing the first object is sent, a sending animation of the first object can be presented, thereby can enrich the presentation form of the interactive picture at the time of being sent and received and improve the interaction effect at the time of sending and receiving the interactive picture.

In the present embodiment, the receiving track and the sending track of the first object may be different. For example, the first object may have different moving directions and/or moving routes in its receiving animation and sending animation. In an example, the moving direction of the first object in its receiving animation and the moving direction of the first object in its sending animation may be at an angle, and/or the moving route of the first object in its receiving animation and the moving route of the first object in its sending animation may not completely overlap. The receiving track being different from the sending track may comprise: a moving direction corresponding to the receiving track being opposite to a moving direction corresponding to the sending track, so as to present a visual effect of the first object moving away from the first user and moving to the second user. For example, the first object may move from left to right/from right to left in its sending animation, and move from right to left/from left to right in its receiving animation; alternatively, the first object may move from near to far in its sending animation, and move from far to near in its receiving animation, etc. The following description is illustrated with reference to the example that the first object can move from near to far in its sending animation and from far to near in its receiving animation.

In an implementation, a receiving visual characteristic of receiving the first object in a three-dimensional space is presented in the receiving animation, the receiving visual characteristic is different from a sending visual characteristic, and the sending visual characteristic is a visual characteristic of sending the first object in the three-dimensional space presented in the sending animation.

The receiving visual characteristic may be a visual characteristic exhibited by the first object in its receiving animation. The sending visual characteristic may be a visual characteristic exhibited by the first object in its sending animation.

In the above-described implementation, in addition to having different movement tracks in the receiving animation and the sending animation of the first object, the first object may have a visual difference between receiving and sending in the three-dimensional space. For example, the first object may present, in its receiving animation, a receiving visual characteristic of receiving the first object in the three-dimensional space, and present, in its sending animation, a sending visual characteristic of sending the first object in the three-dimensional space, so as to present, in the receiving animation of the first object, a visual effect of receiving the first object in the three-dimensional space, and present, in the sending animation of the first object, a visual effect of sending the first object in the three-dimensional space.

Here, the receiving visual characteristic and the sending visual characteristic of the first object can be flexibly set based on a three-dimensional visual effect, and optionally, the receiving visual characteristic comprises a gradual increase in size of the first object; the sending visual characteristic comprises a gradual decrease in size of the first object. That is, in a process of controlling the first object to move along the receiving track in its receiving animation, the display size of the first object may be gradually increased; in a process of controlling the first object to move along the sending track in its sending animation, the display size of the first object may be gradually reduced.

In an implementation, the receiving visual characteristic of the first object may include a visual characteristic of the first object being thrown toward the second user from far to near, and the sending visual characteristic of the first object may include a visual characteristic of throwing the first object far away. For example, in the receiving animation, the first object may be controlled to move along a parabola from far to near and gradually fall (or rise first and then fall); and during the movement, the display size of the first object is gradually increased to its original display size in accordance with a distance of the first object moving in a horizontal direction. In the sending animation, the first object may be controlled to move along a parabola from near to far and gradually fall (or rise first and then fall); and during the movement, the display size of the first object is gradually reduced from an original display size of the first object in accordance with the distance of the first object moving in the horizontal direction.

In an implementation, the first target interactive picture further comprises a second object, the second object having a same movement track in the receiving animation and the sending animation, or a position of the second object remaining unchanged in both the receiving animation and the sending animation.

In the above-described implementation, in addition to the first object having different movement tracks in the receiving animation and the sending animation, the second object having the same movement track in the receiving and sending animations or whose position remaining unchanged in the receiving and sending animations, such as an image or a character having the same movement track in the receiving and sending animations or whose position remaining unchanged in the receiving and sending animations, or the like, may be contained in the first object interactive picture. Accordingly, in addition to the first object, the second object may be displayed in the receiving/sending animation, wherein the first object moves along a receiving/sending track in the receiving/sending animation; the second object moves along the same movement track in the receiving and sending animations, or the second object remains its position unchanged in both the receiving and sending animations, e.g., remains the display of the second object or displays the second object with a certain display frequency at a preset display position.

In an implementation, the method for presenting an animation provided by the present embodiment further comprises: if the first target interactive picture is a preset interactive picture or the first target interactive picture comprises a preset object in the preset interactive picture, selecting, from candidate interactive animations of the preset interactive picture and in accordance with a preset selection rule, one candidate interactive animation as a receiving animation of the first target interactive picture, and presenting the receiving animation of the first target interactive picture, wherein the preset interactive picture is an interactive picture with at least two candidate interactive animations.

The preset interactive picture may be an interactive picture with at least two candidate interactive animations, and each of the at least two candidate interactive animations may be used for presenting as a receiving/sending animation of the preset interactive picture. The preset interactive picture may comprise a preset object, and the preset object may have different visual characteristics and/or movement tracks in different candidate interactive animations. The preset object may be the same or different object as the first object.

When the first target interactive picture is the preset interactive picture or contains the preset object in the preset interactive picture, one candidate interactive animation can be selected, from the candidate interactive animations of the preset interactive picture and in accordance with the preset selection rule, as a receiving animation of the first target interactive picture. For example, one candidate interactive animation is randomly selected, from at least two candidate interactive animations, as a receiving animation of the first target interactive picture; or in accordance with a preset sequence, a candidate interactive animation, which is located after the animation presented upon the last sending and/or receiving of the first target interactive picture and is adjacent to the animation, is selected, from at least two candidate interactive animations, as a receiving animation of the first target interactive picture; or a candidate interactive animation presented when the first user side sends the first target interactive picture is selected as a receiving animation of the first target interactive picture. The receiving animation of the first target interactive picture is presented in a session interface where the current session is located. For example, when no animation is presented in the session interface, the receiving animation of the first target interactive picture can be directly presented in the session interface; when an animation is presented in the session interface, the presentation of the animation may be terminated and the receiving animation of the first target interactive picture may be presented in the session interface, or the currently presented animation may be continued to be presented in the session interface and the presentation of the receiving animation of the first target interactive picture may be cancelled, or the currently presented animation may be continued to be presented in the session interface and the receiving animation of the first target interactive picture may be presented in the session interface after the presentation of the animation is completed.

In an implementation, the method for presenting an animation provided by the present embodiment further comprises: if second target interactive pictures whose number is greater than or equal to a preset number are contained in the latest n session messages received within the current session, presenting a preset interactive enhanced animation of the second target interactive pictures, wherein the second target interactive pictures are interactive pictures with the preset interactive enhanced animation, and the n is a positive integer.

The second target interactive pictures may be interactive pictures with the preset interactive enhanced animation, which may be the same or different interactive pictures as the first target interactive picture. The n and the preset number both can be set as required. For example, the n can be set to a numerical value of 3 or 5, etc., and the preset number can be set to a numerical value of 5 or 10, etc.

As an example, when a session message sent by a user (including the first user) other than the second user is received in the current session, whether the session message contains the second target interactive pictures can be determined. If the session message contains the second target interactive pictures, the number of the second target interactive pictures contained in the latest n session messages received by the second user in the current session is counted. If the number is greater than or equal to a preset number, a preset interactive enhancement animation of the second target interactive pictures is presented in a session interface where the current session is located. If the number is less than the preset number, the example returns to perform an operation of determining, when a session message sent by other user(s) is received in the current session, whether the session message contains second target interactive pictures. If the session message does not contain the second target interactive pictures, the example returns to perform an operation of determining, when a session message sent by other user(s) is received in the current session, whether the session message contains the second target interactive pictures.

In the present embodiment, the presenting way of the preset interactive enhanced animation of the second target interactive pictures can be flexibly set. For example, when no animation is presented in the currently presented session interface, the preset interactive enhanced animation of the second target interactive pictures is directly presented in the session interface; and/or when an animation is presented in the session interface, the presentation of the animation presented in the session interface is terminated and the preset interactive enhanced animation of the second target interactive pictures is presented in the session interface, or the animation is continued to be presented in the session interface and when the presentation of the animation is completed, the preset interactive enhanced animation of the second target interactive pictures is presented in the session interface.

The method for presenting an animation provided in the present embodiment receives a target session message sent by a first user, wherein the target session message contains a first target interactive picture; presents the target session message in a session interface; if a first object is contained in the first target interactive picture, a receiving animation of the first object is presented in the session interface, wherein the receiving animation comprises a receiving track of the first object, the receiving track being different from a sending track of the first object comprised in a sending animation of the first object, the sending animation being an animation presented by a first user side in response to sending the first target interactive picture. With the above-described solution(s), different animations are presented on the first user side at which the target interactive picture is sent and on the second user side at which the target interactive picture is received, which can enrich the presentation form of the interactive picture at the time of being sent and received and improve the interaction effect at the time of sending and receiving the interactive picture.

Figure 4:
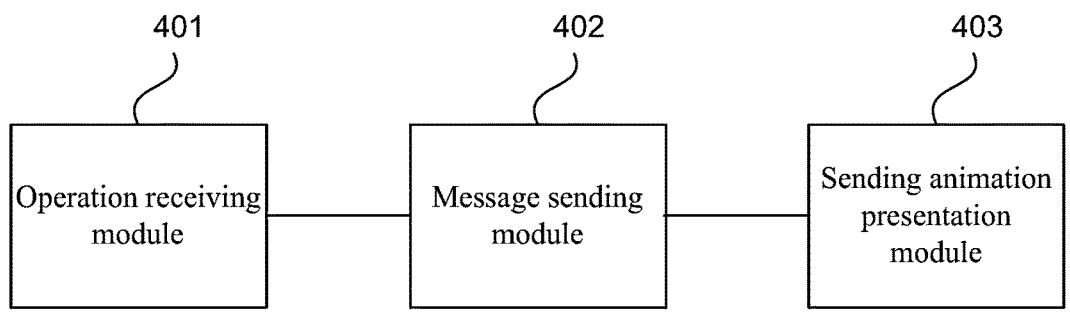
FIG. 4 is a block diagram of an apparatus for presenting an animation provided by an embodiment of the present disclosure.

FIG. 4 is a block diagram of an apparatus for presenting an animation provided by an embodiment of the present disclosure. The apparatus may be implemented by software and/or hardware, may be configured in an electronic device, may be configured in a mobile phone or a tablet computer, and may present, when the interactive picture is sent, a sending animation of an interactive picture by performing a method for presenting an animation. As shown in FIG. 4, the apparatus for presenting an animation provided by the present embodiment may include: an operation receiving module 401, a message sending module 402, and a sending animation presentation module 403.

The operation receiving module 401 is configured to receive a sending operation for a target session message, wherein a first target interactive picture is included in the target session message.

The message sending module 402 is configured to send, in response to the sending operation, the target session message to a second user.

The sending animation presentation module 403 is configured to when the first target interactive picture comprises a first object, present a sending animation of the first object, wherein the sending animation comprises a sending track of the first object, the sending track being different from a receiving track, the receiving track being a movement track of the first object comprised in a receiving animation of the first object, and the receiving animation being an animation presented by a second user side in response to receiving the first target interactive picture.

The apparatus for presenting an animation provided in the present embodiment receives a sending operation for a target session message via the operation receiving module 401, wherein the target session message contains a first target interactive picture; in response to the sending operation, the message sending module 402 sends the target session message to the second user; when a first object is contained in the first target interactive picture, a sending animation of the first object is presented by the sending animation presentation module 403, wherein the sending animation comprises a sending track of the first object, and the sending track is different from a receiving track of the first object comprised in a receiving animation of the first object, and the receiving animation is an animation presented by a second user side in response to receiving the first target interactive picture. With the above-described solution(s), different animations are presented on the first user side at which the target interactive picture is sent and on the second user side at which the target interactive picture is received, which can enrich the presentation form of the interactive picture at the time of being sent and received and improve the interaction effect at the time of sending and receiving the interactive picture.

In the above-described solution, the sending track being different from the receiving track may comprise: a moving direction corresponding to the sending track being opposite to a moving direction corresponding to the receiving track.

In the above-described solution, a sending visual characteristic of sending the first object in a three-dimensional space may be presented in the sending animation, the sending visual characteristic may be different from a receiving visual characteristic, and the receiving visual characteristic may be a visual characteristic of receiving the first object in the three-dimensional space presented in the receiving animation.

In the above-described solution, the sending visual characteristic may comprise a gradual decrease in size of the first object; the receiving visual characteristic comprises a gradual increase in size of the first object.

In the above-described solution, the first target interactive picture may further comprise a second object, the second object may have a same movement track in the sending animation and the receiving animation, or a position of the second object may remain unchanged in the sending animation and the receiving animation.

In the above-described solution, the sending animation presentation module 403 may be configured to: if no animation is presented in a current interface, present the sending animation of the first object in the current interface; or if an animation is presented in a current interface, stop presenting a current animation presented in the current interface, and present the sending animation of the first object in the current interface.

The apparatus for presenting an animation provided by the present embodiment may further comprise: an animation selection module configured to when the first target interactive picture is a preset interactive picture or the first target interactive picture comprises a preset object in the preset interactive picture, select, from at least two candidate interactive animations of the preset interactive picture, one candidate interactive animation as a sending animation of the first target interactive picture, and present the sending animation of the first target interactive picture, wherein the preset interactive picture is an interactive picture with at least two candidate interactive animations.

The apparatus for presenting an animation provided by the present embodiment may further comprise: an enhanced animation presentation module configured to when second target interactive pictures whose number is greater than or equal to a preset number are contained in the latest n session messages sent by a first user within a current session, present a preset interactive enhanced animation of the second target interactive pictures, wherein the second target interactive pictures are interactive pictures with the preset interactive enhanced animation, and the n is a positive integer.

The apparatus for presenting an animation provided by an embodiment of the present disclosure can perform a method for presenting an animation which is applied to a first user side in the present disclosure, and has corresponding functional modules and effects for performing the method for presenting an animation. The technical details not described in detail in the present embodiment can be referred to the method for presenting an animation which is applied to the first user side provided by the embodiments of the present disclosure.

Figure 5:
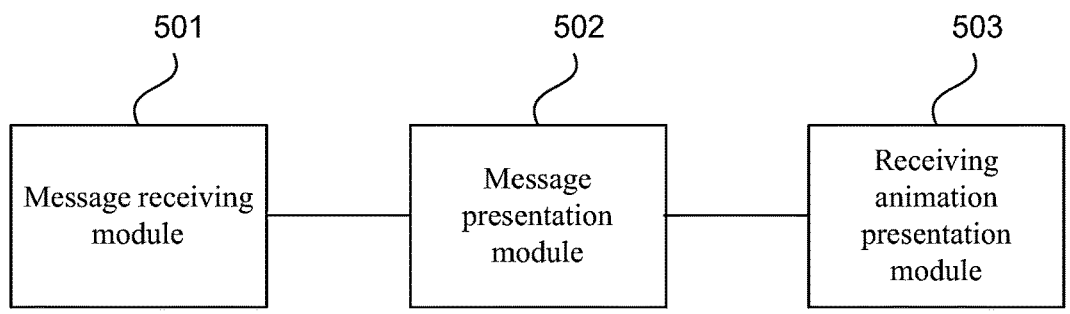
FIG. 5 is a block diagram of another apparatus for presenting an animation provided by an embodiment of the present disclosure.

FIG. 5 is a block diagram of an apparatus for presenting an animation provided by an embodiment of the present disclosure. The apparatus may be implemented by software and/or hardware, may be configured in an electronic device, may be configured in a mobile phone or a tablet computer, and may present, when the interactive picture is received, a receiving animation of an interactive picture by performing a method for presenting an animation. As shown in FIG. 5, the apparatus for presenting an animation provided by the present embodiment may include: a message receiving module 501, a message presentation module 502, and a receiving animation presentation module 503.

The message receiving module 501 configured to receive a target session message sent by a first user, wherein a first target interactive picture is included in the target session message;

The message presentation module 502 configured to present the target session message in a session interface;

The receiving animation presentation module 503 configured to when the first target interactive picture comprises a first object, present a receiving animation of the first object in the session interface, wherein the receiving animation comprises a receiving track of the first object, the receiving track is different from a sending track, the sending track is a movement track of the first object comprised in a sending animation of the first object, and the sending animation is an animation presented by a first user side in response to sending the first target interactive picture.

The apparatus for presenting an animation provided in the present embodiment receives a target session message sent by a first user via the message receiving module 501, wherein the target session message contains a first target interactive picture; presents the target session message in a session interface via the message presentation module 502; when a first object is included in the first target interactive picture, a receiving animation of the first object is presented in the session interface by the receiving animation presentation module 503, wherein the receiving animation comprises a receiving track of the first object, the receiving track is different from a sending track of the first object comprised in the sending animation of the first object, and the sending animation is an animation presented by a first user side in response to sending the first target interactive picture. With the above-described solution(s), different animations are presented on the first user side at which the target interactive picture is sent and on the second user side at which the target interactive picture is received, which can enrich the presentation form of the interactive picture at the time of being sent and received and improve the interaction effect at the time of sending and receiving the interactive picture.

The apparatus for presenting an animation provided by an embodiment of the present disclosure can perform a method for presenting an animation which is applied to a second user side in the present disclosure, and has corresponding functional modules and effects for performing the method for presenting an animation. The technical details not described in detail in the present embodiment can be referred to the method for presenting an animation which is applied to the second user side provided by the embodiments of the present disclosure.

Figure 6:
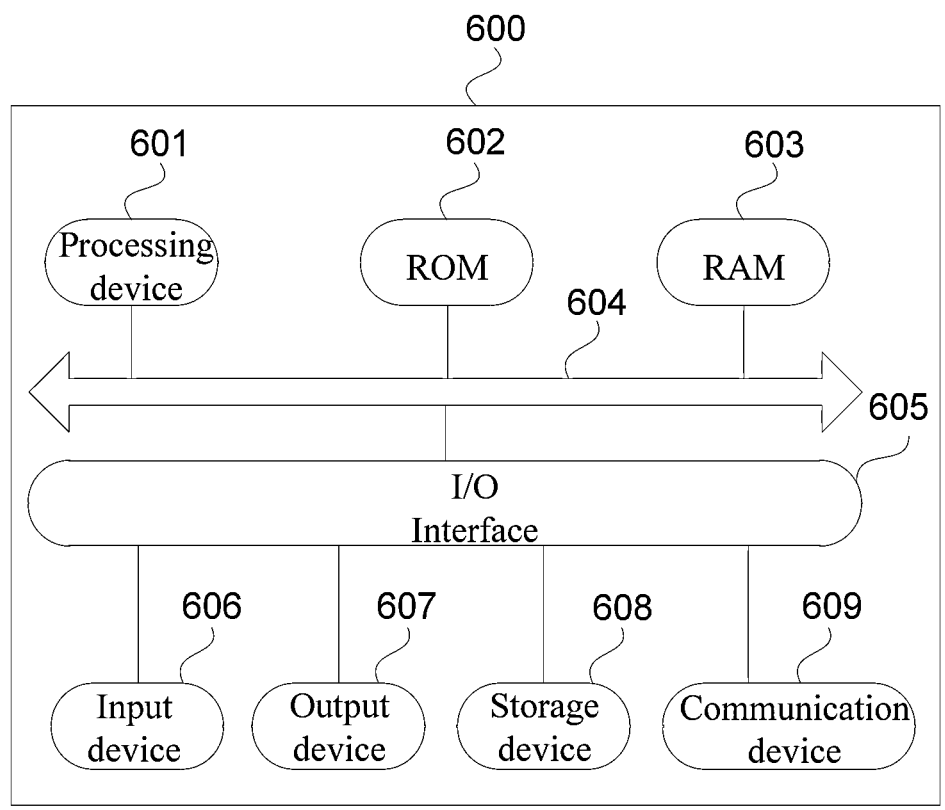
FIG. 6 is a structure diagram of an electronic device provided by an embodiment of the present disclosure.

Referring now to FIG. 6, a structure diagram of an electronic device (e.g. a terminal device) 600 suitable for implementing embodiments of the present disclosure is shown. The terminal device in the embodiments of the present disclosure may include a mobile terminal such as a mobile phone, a notebook computer, a digital broadcast receiver, a Personal Digital Assistant (PDA), a Portable Android Device (PAD), a Portable Multimedia Player (PMP), an in-vehicle terminal (e.g. an in-vehicle navigation terminal), etc. and a fixed terminal such as a television (TV), a desktop computer, etc. The electronic device shown in FIG. 6 is merely an example and should not impose any limitations on the functionality and scope of use of embodiments of the present disclosure.

As shown in FIG. 6, the electronic device 600 may include a processing device (e.g. a central processing unit, a graphics processor, etc.) 601 that may perform a variety of suitable actions and processes in accordance with programs stored in Read-only Memory (ROM) 602 or loaded from a storage device 608 into a Random Access Memory (RAM) 603. In the RAM 603, various programs and data necessary for the operation(s) of the electronic device 600 are also stored. The processing device 601, the ROM 602, and the RAM 603 are connected to each other via a bus 604. An Input/Output (I/O) interface 605 is also coupled to the bus 604.

The following devices may be connected to the I/O interface 605: an input device 606 including, for example, a touch screen, a touch pad, a keyboard, a mouse, a camera, a microphone, an accelerometer, a gyroscope, etc.; an output device 607 including, for example, a Liquid Crystal Display (LCD), a speaker, a vibrator etc.; the storage device 608 including, for example, a magnetic tape, a hard disk, etc.; and a communication device 609. The communication device 609 may allow the electronic device 600 to communicate wirelessly or wired with other devices to exchange data. Although FIG. 6 illustrates an electronic device 600 having multiple devices, it is not required to implement or have all of the illustrated devices. More or fewer devices may alternatively be implemented or provided.

According to embodiments of the present disclosure, the processes described above with reference to flow diagrams may be implemented as a computer software program. For example, embodiments of the present disclosure include a computer program product comprising a computer program embodied on a non-transitory computer-readable medium, the computer program comprising program code for performing the method illustrated by the flowchart. In such embodiments, the computer program may be downloaded and installed from a network via the communication device 609, or installed from the storage device 608, or installed from the ROM 602. When the computer program is executed by the processing device 601, the above-described functions defined in a method of an embodiment of the present disclosure are performed.

The computer-readable medium described above in the present disclosure can be a computer-readable signal medium or a computer-readable storage medium or any combination thereof. The computer-readable storage medium can be, for example, an electronic, magnetic, optical, electromagnetic, infrared, or semiconductor system, apparatus, or device, or any combination thereof. The computer readable storage medium may include: an electrical connection having one or more wires, a portable computer diskette, a hard disk, a RAM, a ROM, an Erasable Programmable Read-Only Memory (EPROM), a flash memory, an optical fiber, a Compact Disc Read-Only Memory (CD-ROM), an optical storage device, a magnetic storage device, or any suitable combination thereof. In this disclosure, the computer-readable storage medium can be any tangible medium that contains or stores a program that can be used by or in connection with an instruction execution system, apparatus, or device. In this disclosure, the computer-readable signal medium may comprise a data signal embodied in baseband or propagated as part of a carrier wave carrying computer-readable program code. This propagated data signal may take many forms, including an electromagnetic signal, an optical signal, or any suitable combination thereof. The computer-readable signal medium can also be any computer-readable medium other than the computer-readable storage medium, which can send, propagate, or transport the program for use by or in connection with the instruction execution system, apparatus, or device. The program code embodied on the computer-readable medium may be transmitted over any suitable medium, including: electric wire, optic cable, Radio Frequency (RF), and the like, or any suitable combination thereof.

In some embodiments, clients, servers may communicate using any currently known or future developed network protocol, such as the HyperText Transfer Protocol (HTTP), and may be interconnected with any form or medium of digital data communication (e.g. a communication network). Examples of the communication network include a Local Area Network (LAN), a Wide Area Network (WAN), an Internetwork (e.g. the Internet), and a peer-to-peer network (e.g. an ad hoc peer-to-peer network), as well as any currently known or future developed network.

The computer readable medium may be contained in the electronic device; it may also be present separately and not fitted into the electronic device.

The computer-readable medium carries one or more programs that, when executed by the electronic device, cause the electronic device to: receive a sending operation for a target session message, wherein the target session message contains a first target interactive picture; in response to the sending operation, send the target session message to a second user; if the first target interactive picture comprises a first object, present a sending animation of the first object, wherein the sending animation comprises a sending track of the first object, the sending track is different from a receiving track, the receiving track is a movement track of the first object comprised in a receiving animation of the first object, and the receiving animation is an animation presented by a second user side in response to receiving the first target interactive picture.

Alternatively, receive a target session message sent by a first user, wherein a first target interactive picture is included in the target session message; present the target session message in a session interface; if the first target interactive picture comprises a first object, present a receiving animation of the first object in the session interface, wherein the receiving animation comprises a receiving track of the first object, the receiving track is different from a sending track, the sending track is a movement track of the first object comprised in a sending animation of the first object, and the sending animation is an animation presented by a first user side in response to sending the first target interactive picture.

Computer program code for carrying out operations of the present disclosure may be written in one or more programming languages, including object oriented programming languages such as Java, smalltalk, C++ and conventional procedural programming languages such as the "C" language or similar programming languages, or a combination thereof. The program code may execute entirely on a user's computer, partly on the user's computer, as a stand-alone software package, partly on the user's computer and partly on a remote computer, or entirely on the remote computer or server. In a case of the remote computer, the remote computer may be connected to the user's computer through any kind of network, including a LAN or a WAN, or may be connected to an external computer (e.g. through the Internet using an Internet Service Provider).

The flow diagrams and block diagrams in the drawings illustrate the architecture, functionality, and operation of possible implementations of systems, methods and computer program products according to various embodiments of the present disclosure. In this regard, each block in the flow diagrams or block diagrams may represent a module, segment, or portion of code, which comprises one or more executable instructions for implementing the specified logical function(s). In some alternative implementations, the functions noted in the blocks may occur out of the order noted in the figures. For example, two blocks shown in succession may in fact be executed substantially concurrently or the blocks may sometimes be executed in the reverse order, depending upon the functionality involved. Each block of the block diagrams and/or flow diagrams, as well as a combination of blocks in the block diagrams and/or flow diagrams, can be implemented by a special purpose hardware-based system which performs the specified functions or operations, or a combination of special purpose hardware and computer instructions.

The elements described in connection with the embodiments disclosed herein may be implemented in software or hardware. The name of a module does not in one case constitute a definition of the unit itself.

The functions described herein above may be performed, at least in part, by one or more hardware logic components. For example, exemplary types of hardware logic components that may be used include: Field Programmable Gate Array (FPGA), Application Specific Integrated Circuit (ASIC), Application Specific Standard Parts (ASSP), System on Chip (SOC), Complex Programmable Logic Device (CPLD), etc.

In the context of this disclosure, the machine-readable medium can be a tangible medium that can contain or store a program for use by or in connection with an instruction execution system, apparatus, or device. The machine-readable medium may be a machine-readable signal medium or a machine-readable storage medium. The machine-readable medium may include an electronic, magnetic, optical, electromagnetic, infrared, or semiconductor system, apparatus, or device, or any suitable combination thereof. The machine-readable storage medium includes an electrical connection based on one or more wires, a portable computer diskette, a hard disk, a RAM, a ROM, an EPROM, a flash memory, an optical fiber, a portable CD-ROM, an optical storage device, a magnetic storage device, or any suitable combination thereof. The storage medium may be a non-transitory storage medium.

According to one or more embodiments of the present disclosure, Example 1 provides a method for presenting an animation, the method being applied to a first user side, the method comprising:

receiving a sending operation for a target session message, wherein a first target interactive picture is included in the target session message;

sending, in response to the sending operation, the target session message to a second user;

if the first target interactive picture comprises a first object, presenting a sending animation of the first object, wherein the sending animation comprises a sending track of the first object, the sending track being different from a receiving track, the receiving track being a movement track of the first object comprised in a receiving animation of the first object, and the receiving animation being an animation presented by a second user side in response to receiving the first target interactive picture.

According to one or more embodiments of the present disclosure, Example 2 provides a method according to Example 1, wherein the sending track being different from the receiving track comprises:

a moving direction corresponding to the sending track being opposite to a moving direction corresponding to the receiving track.

According to one or more embodiments of the present disclosure, Example 3 provides a method according to Example 1, wherein a sending visual characteristic of sending the first object in a three-dimensional space is presented in the sending animation, the sending visual characteristic is different from a receiving visual characteristic, and the receiving visual characteristic is a visual characteristic of receiving the first object in the three-dimensional space presented in the receiving animation.

According to one or more embodiments of the present disclosure, Example 4 provides a method according to Example 3, wherein the sending visual characteristic comprises a gradual decrease in size of the first object; the receiving visual characteristic comprises a gradual increase in size of the first object.

According to one or more embodiments of the present disclosure, Example 5 provides a method according to Example 1, wherein the first target interactive picture further comprises a second object, the second object has a same movement track in the sending animation and the receiving animation, or a position of the second object remains unchanged in the sending animation and the receiving animation.

According to one or more embodiments of the present disclosure, Example 6 provides a method according to any of Examples 1-5, presenting the sending animation of the first object comprises:

if no animation is presented in a current interface, presenting the sending animation of the first object in the current interface; or if an animation is presented in a current interface, stopping presenting a current animation presented in the current interface, and presenting the sending animation of the first object in the current interface.

According to one or more embodiments of the present disclosure, Example 7 provides a method according to any of Examples 1-5, further comprising:

if the first target interactive picture is a preset interactive picture or the first target interactive picture comprises a preset object in the preset interactive picture, selecting, from at least two candidate interactive animations of the preset interactive picture, one candidate interactive animation as a sending animation of the first target interactive picture, and presenting the sending animation of the first target interactive picture, wherein the preset interactive picture is an interactive picture with at least two candidate interactive animations.

According to one or more embodiments of the present disclosure, Example 8 provides a method according to any of Examples 1-5, further comprising:

if a number of second target interactive pictures contained in the latest n session messages sent by a first user within a current session is greater than or equal to a preset number, presenting a preset interactive enhanced animation of the second target interactive pictures, wherein the second target interactive pictures are interactive pictures with the preset interactive enhanced animation, and the n is a positive integer.

According to one or more embodiments of the present disclosure, Example 9 provides a method for presenting an animation, the method being applied to a second user side, and the method comprising:

receiving a target session message sent by a first user, wherein a first target interactive picture is included in the target session message;

presenting the target session message in a session interface;

if the first target interactive picture comprises a first object, presenting a receiving animation of the first object in the session interface, wherein the receiving animation comprises a receiving track of the first object, the receiving track is different from a sending track, the sending track is a movement track of the first object comprised in a sending animation of the first object, and the sending animation is an animation presented by a first user side in response to sending the first target interactive picture.

According to one or more embodiments of the present disclosure, Example 10 provides an apparatus for presenting an animation comprising:

an operation receiving module configured to receive a sending operation for a target session message, wherein a first target interactive picture is included in the target session message;

a message sending module configured to send, in response to the sending operation, the target session message to a second user;

a sending animation presentation module configured to when the first target interactive picture comprises a first object, present a sending animation of the first object, wherein the sending animation comprises a sending track of the first object, the sending track is different from a receiving track, the receiving track is a movement track of the first object comprised in a receiving animation of the first object, and the receiving animation is an animation presented by a second user side in response to receiving the first target interactive picture.

According to one or more embodiments of the present disclosure, Example 11 provides an apparatus for presenting an animation comprising:

a message receiving module configured to receive a target session message sent by a first user, wherein a first target interactive picture is included in the target session message;

a message presentation module configured to present the target session message in a session interface;

a receiving animation presentation module configured to when the first target interactive picture comprises a first object, present a receiving animation of the first object in the session interface, wherein the receiving animation comprises a receiving track of the first object, the receiving track is different from a sending track, the sending track is a movement track of the first object comprised in a sending animation of the first object, and the sending animation is an animation presented by a first user side in response to sending the first target interactive picture.

According to one or more embodiments of the present disclosure, Example 12 provides an electronic device comprising:
one or more processors;
a memory configured to store one or more programs,
the one or more programs, when executed by the one or more processors, cause the one or more processors to implement a method for presenting an animation of any of Examples 1-9.

According to one or more embodiments of the present disclosure, Example 13 provides a computer-readable storage medium having stored thereon a computer program which, when executed by a processor, implements a method for presenting an animation of any of Examples 1-9.

According to one or more embodiments of the present disclosure, Example 14 provides a computer program product which, when executed by a computer, causes the computer to implement a method for presenting an animation of any of Examples 1-9.

Further, while operations are depicted in a particular order, this should not be understood as requiring that the operations be performed in the particular order shown or in sequential order. In certain circumstances, multitasking and parallel processing may be advantageous. As such, while numerous implementation details have been included in the above discussion, these should not be construed as limiting the scope of the present disclosure. Some of the features described in the context of separate embodiments may also be implemented in combination in a single embodiment. Conversely, various features that are described in the context of a single embodiment can also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

We claim:

1. A method for presenting an animation, the method being applied to a first user side, the method comprising:
receiving a sending operation for a session message, wherein a first interactive picture is included in the session message;
sending, in response to the sending operation, the session message to a second user;
in response to the first interactive picture comprising a first object, presenting a sending animation of the first object,
wherein the method further comprises:
in response to a number of second interactive pictures contained in a latest n session messages sent by a first user within a current session being greater than or equal to a preset number, presenting a preset interactive enhanced animation of the second interactive pictures, wherein the second interactive pictures are interactive pictures with the preset interactive enhanced animation, and the n is a positive integer.

2. The method of claim 1, wherein the sending animation comprises a sending track of the first object, the sending track being different from a receiving track, the receiving track being a movement track of the first object comprised in a receiving animation of the first object, and the receiving animation being an animation presented by a second user side in response to receiving the first interactive picture,
wherein the sending track being different from the receiving track comprises:
a moving direction corresponding to the sending track being opposite to a moving direction corresponding to the receiving track.

3. The method of claim 2, wherein a sending visual characteristic of sending the first object in a three-dimensional space is presented in the sending animation, the sending visual characteristic is different from a receiving visual characteristic, and the receiving visual characteristic is a visual characteristic of receiving the first object in the three-dimensional space presented in the receiving animation.

4. The method of claim 3, wherein the sending visual characteristic comprises a gradual decrease in size of the first object; the receiving visual characteristic comprises a gradual increase in size of the first object.

5. The method of claim 2, wherein the first interactive picture further comprises a second object, the second object has a same movement track in the sending animation and the receiving animation, or a position of the second object remains unchanged in the sending animation and the receiving animation.

6. The method of claim 2, wherein presenting the sending animation of the first object comprises:
in response to no animation being presented in a current interface, presenting the sending animation of the first object in the current interface; or
in response to an animation being presented in a current interface, stopping presenting a current animation presented in the current interface, and presenting the sending animation of the first object in the current interface.

7. The method of claim 2, further comprising:
in response to the first interactive picture being a preset interactive picture or the first interactive picture comprises a preset object in the preset interactive picture, selecting, from at least two candidate interactive animations of the preset interactive picture, one candidate interactive animation as a sending animation of the first interactive picture, and presenting the sending animation of the first interactive picture, wherein the preset interactive picture is an interactive picture with at least two candidate interactive animations.

8. A method for presenting an animation, the method being applied to a second user side, and the method comprising:
receiving a session message sent by a first user, wherein a first interactive picture is included in the session message;
presenting the session message in a session interface;
in response to the first interactive picture comprising a first object, presenting a receiving animation of the first object in the session interface,
wherein the method further comprises:
in response to a number of second interactive pictures contained in a latest n session messages received by the second user within a current session being greater than or equal to a preset number, presenting a preset interactive enhanced animation of the second interactive pictures, wherein the second interactive pictures are interactive pictures with the preset interactive enhanced animation, and the n is a positive integer.

9. The method of claim 8, wherein the receiving animation comprises a receiving track of the first object, the receiving track being different from a sending track, the sending track being a movement track of the first object comprised in a sending animation of the first object, and the sending animation being an animation presented by a first user side in response to sending the first interactive picture,
wherein the receiving track being different from the sending track comprises:
a moving direction corresponding to the receiving track being opposite to a moving direction corresponding to the sending track.

10. The method of claim 9, wherein a receiving visual characteristic of receiving the first object in a three-dimensional space is presented in the receiving animation, the receiving visual characteristic is different from a sending visual characteristic, and the sending visual characteristic is a visual characteristic of sending the first object in the three-dimensional space presented in the sending animation.

11. The method of claim 10, wherein the receiving visual characteristic comprises a gradual increase in size of the first object; the sending visual characteristic comprises a gradual decrease in size of the first object.

12. An electronic device comprising:
at least one processor;
a memory configured to store at least one program,
the at least one program, when executed by the at least one processor, causes the at least one processor to perform:
receiving a sending operation for a session message, wherein a first interactive picture is included in the session message;
sending, in response to the sending operation, the session message to a second user;
in response to the first interactive picture comprising a first object, presenting a sending animation of the first object,
wherein the at least one processor is further caused to perform:
in response to a number of second interactive pictures contained in a latest n session messages sent by a first user within a current session being greater than or equal to a preset number, presenting a preset interactive enhanced animation of the second interactive pictures, wherein the second interactive pictures are interactive pictures with the preset interactive enhanced animation, and the n is a positive integer.

13. The electronic device of claim 12, wherein the sending animation comprises a sending track of the first object, the sending track being different from a receiving track, the receiving track being a movement track of the first object comprised in a receiving animation of the first object, and the receiving animation being an animation presented by a second user side in response to receiving the first interactive picture,
wherein the sending track being different from the receiving track comprises:
a moving direction corresponding to the sending track being opposite to a moving direction corresponding to the receiving track.

14. The electronic device of claim 13, wherein a sending visual characteristic of sending the first object in a three-dimensional space is presented in the sending animation, the sending visual characteristic is different from a receiving visual characteristic, and the receiving visual characteristic is a visual characteristic of receiving the first object in the three-dimensional space presented in the receiving animation.

15. The electronic device of claim 14, wherein the sending visual characteristic comprises a gradual decrease in size of the first object; the receiving visual characteristic comprises a gradual increase in size of the first object.

16. The electronic device of claim 13, wherein the first interactive picture further comprises a second object, the second object has a same movement track in the sending animation and the receiving animation, or a position of the second object remains unchanged in the sending animation and the receiving animation.

17. The electronic device of claim 13, wherein presenting the sending animation of the first object comprises:
in response to no animation being presented in a current interface, presenting the sending animation of the first object in the current interface; or
in response to an animation being presented in a current interface, stopping presenting a current animation presented in the current interface, and presenting the sending animation of the first object in the current interface.

18. The electronic device of claim 13, wherein the at least one processor is further caused to perform:
in response to the first interactive picture being a preset interactive picture or the first interactive picture comprises a preset object in the preset interactive picture, selecting, from at least two candidate interactive animations of the preset interactive picture, one candidate interactive animation as a sending animation of the first interactive picture, and presenting the sending animation of the first interactive picture, wherein the preset interactive picture is an interactive picture with at least two candidate interactive animations.

* * * * *